3,054,807
EPOXIDATION OF UNSATURATED COMPOUNDS USING SOLID SILICOPHOSPHORIC ACID CATALYST
Herman S. Bloch, Skokie, Ill., assignor to Universal Oil Products Company, Des Plaines, Ill., a corporation of Delaware
No Drawing. Filed June 15, 1959, Ser. No. 820,083
9 Claims. (Cl. 260—348.5)

This application is a continuation-in-part of my copending application Serial No. 692,259, filed October 25, 1957, now abandoned.

This invention relates to a process for the epoxidation of olefinically unsaturated compounds and more particularly to a process for epoxidizing said compounds in the presence of a solid acidic catalyst.

An object of this invention is to prepare epoxy compounds by treating an unsaturated compound with an oxygen-containing compound in the presence of a solid acidic catalyst.

A further object of this invention is to prepare epoxy compounds by treating olefins with hydrogen peroxide in the presence of a solid acidic catalyst containing an oxygen acid of phosphorus.

One embodiment of this invention is found in a process for the epoxidation of an unsaturated compound containing at least one ethylenic linkage which comprises reacting said compound with hydrogen peroxide in the presence of a calcined composite of a phosphoric acid and a solid adsorbent therefor.

A further embodiment of this invention resides in a process for the epoxidation of an unsaturated hydrocarbon containing at least one ethylenic linkage which comprises reacting said hydrocarbon with an excess of concentrated hydrogen peroxide over said hydrocarbon in the presence of a calcined composite of a phosphoric acid and a solid adsorbent therefor, acetic acid and an inert organic diluent comprising a paraffinic hydrocarbon at a temperature in the range of from about 40° to about 100° C.

A specific embodiment of the invention resides in a process for the epoxidation of ethylene which comprises reacting said ethylene with an excess of concentrated hydrogen peroxide over said ethylene in the presence of silicophosphoric acid, acetic acid and pentane at a temperature in the range of from about 50° to about 70° C.

Other objects and embodiments referring to alternative olefinically unsaturated compounds will be found in the following further detailed description of the invention.

It is now proposed that oxygen-containing organic compounds, and particularly epoxy compounds, may be prepared by treating olefinically unsaturated compounds containing at least one ethylenic linkage with an excess of hydrogen peroxide in the presence of a solid acidic catalyst, preferably one which comprises a calcined composite of an oxygen-containing acid of phosphorus and a solid siliceous support. The oxygen-containing organic compounds thus prepared will find a wide variety of uses in the chemical field. For example, unsaturated glycerides may be converted to epoxides which are useful in preparing alkyd resins. In addition, unsaturated cyclic hydrocarbons such as the various terpenes may be converted to epoxides which are useful in polyester synthesis.

Olefinically unsaturated compounds which may be converted to the corresponding epoxides according to the process of this invention include the aliphatic unsaturated hydrocarbons such as alkenes and alkadienes containing only carbon and hydrogen atoms, examples of which include ethylene, propylene, 1-butene, 2-butene, 1-pentene, 2-pentene, 3-pentene, 1-hexene, 2-hexene, 3-hexene, 1-heptene, 2-heptene, 3-heptene, the octenes, nonenes, decenes, etc.; 1,3-butadiene, 1,3-pentadiene, 1,4-pentadiene, 1,3-hexadiene, 1,4-hexadiene, 1,5-hexadiene, 1,3-heptadiene, 1,4-heptadiene, 1,5-heptadiene, 1,6-heptadiene, etc.; the cyclic unsaturated hydrocarbons, both cycloalkenes and cycloalkadienes containing only carbon and hydrogen atoms, such as cyclopentene, cyclohexene, cycloheptene, cyclooctene, etc., cyclopentadiene, 1,3-cyclohexadiene, 1,4-cyclohexadiene, 1,3-cycloheptadiene, 1,4-cycloheptadiene, etc.; unsaturated glycerides such as vegetable oils including linseed oil, walnut oil, safflower oil, soya bean oil, poppy seed oil, millet seed oil, mahogany seed oil, strawberry seed oil, oiticica oil, raspberry seed oil, cranberry seed oil, blackberry seed oil, mulberry seed oil, pumpkin seed oil, melon seed oil, beechnut oil, sesame oil, pecan oil, rapeseed oil, almond oil, olive oil, dehydrated castor oil, etc., animal oils, including fish oils such as menhaden oil, sardine oil, salmon oil, cod liver oil, seal oil, whale oil, etc., the mono-, di- and tri-glycerides of the unsaturated acids containing only carbon, hydrogen and oxygen atoms such as tiglic acid, hypogaeic acid, palmitoleic acid, oleic acid, elaidic acid, isooleic acid, petroselinic acid, gadoleic acid, erucic acid, brassidic acid, etc., linoleic acid, sorbic acid, geranic acid, etc.; cyclic olefin hydrocarbons such as the terpenes including limonene, sabinene, 3-carene, α-pinene, β-pinene, dipentene, terpinolene, α-, β- or γ-terpinene, α- or β-phellandrene, sylvestrene, carvestrene, etc. The aforementioned unsaturated compounds are only representatives of the class of compounds which may be used and this invention is not necessarily limited thereto.

These unsaturated compounds hereinbefore mentioned are treated with an excess of hydrogen peroxide, the amount of hydrogen peroxide used being in the range of from about 1.1 mol to about 1.5 mol per mol of unsaturated compound to be epoxidized. The hydrogen peroxide which is used is in a concentrated solution thereof, that is, a solution containing in the range of 10–50% hydrogen peroxide, and preferably about 30% hydrogen peroxide. In addition, if so desired, the reaction may be carried out in the presence of from about 0.35 to about 0.75 mol of acetic acid per double bond of unsaturated compound. However, the addition of acetic acid to the reaction mixture is not essential. It is believed that the silicophosphoric acids which are the preferred catalysts form persilicophosphoric acids by reaction with hydrogen peroxide, and that these persilicophosphoric acids serve as active intermediates to effect epoxidation of the olefinic compounds, thereby omitting the necessity of the presence of the acetic acid. Also, it may in some cases be preferable to carry out the reaction in the presence of a substantially inert organic diluent such as a paraffinic hydrocarbon of either straight chain or cyclic type, which will include pentane, hexane, heptane, cyclopentane, cyclohexane, cycloheptane, methyl cyclopentane, methyl cyclohexane, methyl cycloheptane, etc. Of these, the compounds which have no tertiary hydrogen are preferred, such as the normal paraffins and unsubstituted naphthenes, or gem-compounds such as neopentane.

The reaction will take place at temperatures in the range of from about 40° to about 90° C., and preferably at temperatures in the range of from about 50° to about 70° C. In addition the reaction will usually take place at atmospheric pressure. However, if higher temperatures are used for the reaction, higher pressure will also be required ranging from 2 to about 100 atmospheres or more, the amount of pressure used being that which is necessary to maintain at least a portion of the feed material in the liquid state.

The epoxidation of the unsaturated compound by treatment with concentrated hydrogen peroxide is effected in the presence of a catalyst comprising a calcined composite of an oxygen acid of phosphorus and a solid siliceous carrier or absorbent, said composite being referred to as a solid silicophosphoric acid. The oxygen acids of phosphorus which are used in the preparation of the catalyst comprise orthophosphoric and other related acids in which the phosphorus has a valence of 5, including pyrophosphoric acid, triphosphoric acid, tetraphosphoric acid, hexametaphosphoric acid, etc., as well as mixtures of said acids. The aforementioned acids may constitute from about 50% to about 80% or more by weight of the catalyst mixture ultimately produced. Of the various acids hereinbefore set forth, orthophosphoric acid ($H_3PO_4$) and pyrophosphoric acid ($H_4P_2O_7$) find general application in the primary mixtures used in preparing the catalyst, due partially to their cheapness and to the readiness with which they may be procured, although the invention is not restricted to their use but may employ any of the other acids of phosphorus insofar as they are adaptable.

A phosphoric acid mixture which is generally referred to as polyphosphoric acid may also be employed in this process. Polyphosphoric acid is formed by heating orthophosphoric acid or pyrophosphoric acid or mixtures thereof in suitable equipment such as carbon lined trays heated by flue gas or other suitable means to produce a phosphoric acid mixture generally analyzing from about 79 to about 85% by weight of $P_2O_5$.

The siliceous materials which may be employed as adsorbents or solid carriers for oxygen acids of phosphorus are divided roughly into two classes. The first class comprises materials of predominantly siliceous character and includes diatomaceous earth, kieselguhr and artificially prepared porous silica. The second class of materials which may be employed, either alone or in conjunction with the first class comprises generally certain members of the class of aluminum silicates and includes such naturally occurring substances as various fuller's earths and clays such as bentonite, montmorillonite, acid-treated clays and the like. Each adsorbent or supporting material which may be used will exert its own specific influence upon the net effectiveness of the catalyst composite and will not necessarily be identical with that of other members of the class.

The catalyst which is used in the present invention may be formed by mixing an oxygen acid of phosphorus and a siliceous adsorbent at a temperature of from about 50° to about 450° F. and preferably at a temperature of from about 200° to about 300° F. to form a composite. Satisfactory results have been obtained by heating polyphosphoric acid (84% $P_2O_5$ content) at a temperature of about 340° F. and then mixing this hot acid with diatomaceous earth which had previously been at room temperature. The polyphosphoric acid and diatomaceous earth form a composite which may vary in appearance from a thin paste to almost a dry powder, but which becomes plastic when subjected to heat or to pressure in a hydraulic pressure-type or auger-type extruder by which the composite is formed into pieces that are cut into shaped particles. The resultant catalyst composite may have to be heated or dried at a temperature of from about 200° to about 500° F. to form a substantially plastic material before being extruded or pelleted.

The catalyst is then formed into the desired shape and subjected to calcination by heating the particles in air, nitrogen, flue gas, or other inert gas at a temperature in the range of from about 500° to about 1400° F. for a time ranging from about 0.25 to about 8 hours, thus forming a substantially solid granular catalytic material.

Calcination of such composites results in the formation of a solid silicophosphoric acid, the particular silicophosphoric acid being dependent upon the oxygen acid of phosphorus which was used such as pyrophosphoric acid, triphosphoric acid, tetraphosphoric acid, polyphosphoric acid, etc., and the particular siliceous adsorbent. The catalysts thus prepared are known in the art and hereinafter referred to in the specification and appended claims as solid phosphoric acid catalysts.

The process of this invention may be effected in any suitable manner and may comprise either a batch or a continuous type operation. When a batch type operation is used, a quantity of the starting material, namely the olefinically unsaturated compound, the hydrogen peroxide and, if so desired, the acetic acid and inert diluent, are placed in a reaction vessel containing a silicophosphoric acid (solid phosphoric acid) catalyst. The vessel is then heated to the desired temperature and maintained thereat for a predetermined residence time while the starting materials are thoroughly admixed. At the end of this residence time, the flask and contents thereof are cooled to room temperature, the reaction mixture is separated from the catalyst and the desired epoxy compound is recovered by conventional means such as fractional distillation, crystallization, etc.

Another method of effecting the epoxidation of unsaturated compounds which constitutes the preferred type of this invention comprises the continuous type operation. In this operation, the starting materials comprising the olefinically unsaturated compound and the concentrated hydrogen peroxide along with the acetic acid and saturated hydrocarbon diluent (if these are used) are continuously charged to a reaction zone containing a solid phosphoric acid catalyst which is maintained at the proper operating conditions of temperature and pressure. The starting materials may be continuously charged to the reactor through separate lines, or if so desired, two or more of the materials may be admixed prior to entry into said reactor and charged thereto in a single stream, the reactants being charged to the reaction zone at a liquid hourly space velocity (volume of charge per volume of catalyst per hour) in the range of from about 0.5 to about 10. After completion of the desired residence time, the reaction product is continuously withdrawn and separated from the unreacted feed, the latter being recycled to form a portion of the feed stock while the desired epoxy compounds are separated and recovered by conventional means hereinbefore set forth. Of the various types of continuous operations, the fixed bed type in which the catalyst is disposed as a fixed bed in the reaction zone and the reactants passed therethrough in either an upward or downward flow constitutes the preferred method of operation. Other continuous types of operation which may be used are the compact moving bed type in which the catalyst and the reactants pass through said zone either concurrently or countercurrently to each other and the slurry type in which the catalyst is carried into the reaction zone as a slurry in one of the starting materials, preferably in the saturated diluent if said material is used. In each of the continuous types of operations, the unreacted starting materials are recovered and recycled to form a portion of the feed stock while the epoxy compound is separated, purified and recovered.

The following examples are given to illustrate the process of the present invention, which, however, are not intended to limit the generally broad scope of the present invention in strict accordance therewith.

*Example I*

A mixture of 58.5 grams of concentrated (30%) hydrogen peroxide, 15.5 grams of acetic acid and 50 cc. of pentane, along with 15 grams of solid phosphoric acid catalyst in the form of crushed granules is placed in a condensation autoclave provided with heating and stirring means. The flask is sealed and 13.2 grams of ethylene are pressured in from a tared weighing bomb. The flask is then heated to a temperature of about 50° C. and maintained thereat for a period of about 4 hours while continuously stirring the reaction mixture. At the end of this time, the flask and contents thereof are cooled to room temperature, the excess pressure vented and the reaction product is separated from the catalyst. This reaction product is then subjected to fractional distillation, the cut boiling at 13–14° C., comprising ethylene oxide, being separated and recovered.

*Example II*

A mixture similar to that set forth in Example I above is prepared and placed in a similar autoclave. The flask is sealed and 19.8 grams of propylene pressured in from a tared cylinder. The flask is heated to a temperature of about 60° C. and maintained thereat for a period of about 4 hours. At the end of this time the flask and contents thereof are cooled to room temperature, the excess pressure is vented and the reaction product is separated from the catalyst. The product is then subjected to fractional distillation and the cut boiling at 35–36° C. comprising 1,2-propylene oxide is separated and recovered.

*Example III*

A mixture of 41 grams of cyclohexene, 16.5 grams of acetic acid, 63 g. of 30% hydrogen peroxide and 50 cc. of pentane is placed in a condensation apparatus along with 18 grams of crushed solid phosphoric acid catalyst. The flask is sealed and heated to a temperature of about 60° C. while continuously stirring the reaction mixture. At the end of about 4 hours, the flask and contents thereof are allowed to cool to room temperature and the reaction product is separated from the catalyst. This product is then subjected to fractional distillation, the desired product comprising 1,2-epoxycyclohexane being separated therefrom and recovered.

*Example IV*

A reaction mixture comprising 56 grams of α-pinene, 187 grams of concentrated (20%) hydrogen peroxide, 36 grams of acetic acid and 50 cc. of hexane, along with 20 grams of solid phosphoric acid catalyst is treated at 50° C. in the manner similar to that set forth in the examples above. The product recovered has the properties of a diepoxide believed to be 2,3-epoxypinole, having the following formula:

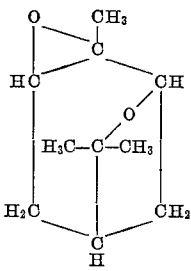

this compound being the epoxide of pinole having the following formula:

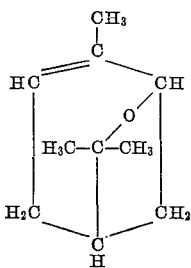

said formula for pinole being set forth in Organic Chemistry, by Karrer, page 681, third English edition (1947).

*Example V*

A mixture of 56.4 grams of oleic acid, 28.3 grams of 30% hydrogen peroxide and 50 cc. of pentane is placed in a condensation apparatus along with 18 grams of crushed solid phosphoric acid catalyst. The flask is sealed and heated to a temperature of about 60° C. while continuously stirring the reaction mixture. At the end of about 4 hours the flask and contents thereof are allowed to cool to room temperature, the reaction product is separated from the catalyst layer. This product is then subjected to fractional distillation, the desired product comprising 9,10-epoxyoleic acid being separated therefrom and recovered.

I claim as my invention:

1. A process for the epoxidation of an unsaturated compound selected from the group consisting of monoolefinic hydrocarbons of from 2 to about 10 carbon atoms, diolefinic hydrocarbons of from 4 to about 10 carbon atoms, unsaturated glycerides of animal and vegetable origin and the unsaturated fatty acid components of said glycerides, which comprises reacting said compound with hydrogen peroxide in the presence of a catalytic amount of solid silicophosphoric acid catalyst at a temperature of from about 40° C. to about 100° C.

2. A process for the epoxidation of an unsaturated compound selected from the group consisting of monoolefinic hydrocarbons of from 2 to about 10 carbon atoms, diolefinic hydrocarbons of from 4 to about 10 carbon atoms, unsaturated glycerides of animal and vegetable origin and the unsaturated fatty acid components of said glycerides, which comprises commingling said compound with from about 1.1 to about 1.5 mols of hydrogen peroxide per mol of said compound and reacting said compound and hydrogen peroxide in the presence of a catalytic amount of solid silicophosphoric acid catalyst at a temperature of from about 40° C. to about 100° C.

3. A process for the epoxidation of an unsaturated compound selected from the group consisting of monoolefinic hydrocarbons of from 2 to about 10 carbon atoms, diolefinic hydrocarbons of from 4 to about 10 carbon atoms, unsaturated glycerides of animal and vegetable origin and the unsaturated fatty acid components of said glycerides, which comprises commingling said compound with from about 1.1 to about 1.5 mols of hydrogen peroxide per mol of said compound and reacting said compound and hydrogen peroxide in the presence of a catalytic amount of solid silicophosphoric acid catalyst and acetic acid at a temperature of from about 40° C. to about 100° C.

4. A process for the epoxidation of an unsaturated compound selected from the group consisting of monoolefinic hydrocarbons of from 2 to about 10 carbon atoms, diolefinic hydrocarbons of from 4 to about 10 carbon atoms, unsaturated glycerides of animal and vegetable origin and the unsaturated fatty acid components of said glycerides, which comprises commingling said compound with from about 1.1 to about 1.5 mols of hydrogen peroxide per mol of said compound and reacting said compound and hydrogen peroxide in the presence of a catalytic amount of solid silicophosphoric acid catalyst and an inert organic diluent comprising a paraffinic hydrocarbon at a temperature of from about 40° C. to about 100° C.

5. A process for the epoxidation of ethylene which comprises commingling said ethylene with from about 1.1 to about 1.5 mols of hydrogen peroxide per mol of said ethylene and reacting the ethylene and hydrogen peroxide in the presence of a catalytic amount of solid silicophosphoric acid catalyst at a temperature in the range of from about 50° to about 70° C.

6. A process for the epoxidation of propylene which comprises commingling said propylene with from about 1.1 to about 1.5 mols of hydrogen peroxide per mol of said propylene and reacting the propylene and hydrogen peroxide in the presence of a catalytic amount of solid silicophosphoric acid catalyst at a temperature in the range of from about 50° to about 70° C.

7. A process for the epoxidation of cyclohexene which comprises commingling said cyclohexene with from about 1.1 to about 1.5 mols of hydrogen peroxide per mol of said cyclohexene and reacting the cyclohexene and hydrogen peroxide in the presence of a catalytic amount of solid silicophosphoric acid catalyst at a temperature in the range of from about 50° to about 70° C.

8. A process for the epoxidation of α-pinene which comprises commingling said α-pinene with from about 1.1 to about 1.5 mols of hydrogen peroxide per mol of said α-pinene and reacting the pinene and hydrogen peroxide in the presence of a catalytic amount of solid silicophosphoric acid catalyst at a temperature in the range of from about 50° to about 70° C.

9. A process for the epoxidation of oleic acid which comprises commingling said oleic acid with from about 1.1 to about 1.5 mols of hydrogen peroxide per mol of said oleic acid and reacting the oleic acid and hydrogen peroxide in the presence of a catalytic amount of solid silicophosphoric acid catalyst at a temperature in the range of from about 50° to about 70° C.

References Cited in the file of this patent

UNITED STATES PATENTS 2,870,171   Gable _____ Jan. 20, 1959

FOREIGN PATENTS 202,702   Australia _____ June 21, 1956

OTHER REFERENCES

Swern, J.A.C.S., vol. 69, pages 1692–8 (1947).
Engel, Chem. Abstracts, vol. 49, pages 7154–7155 (1955).
Fiat Final Report 1311, page 59 (received Div. 6, Oct. 16, 1957).